United States Patent
Li et al.

(10) Patent No.: US 10,664,257 B2
(45) Date of Patent: May 26, 2020

(54) SECURE ELEMENT ACTIVITIES

(71) Applicant: Apple Inc., Cupertino, CA (US)

(72) Inventors: Li Li, Los Altos, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 625 days.

(21) Appl. No.: 15/146,771

(22) Filed: May 4, 2016

(65) Prior Publication Data

US 2016/0330175 A1    Nov. 10, 2016

Related U.S. Application Data

(60) Provisional application No. 62/157,920, filed on May 6, 2015.

(51) Int. Cl.
*H04L 29/06* (2006.01)
*G06F 8/65* (2018.01)

(52) U.S. Cl.
CPC ............ *G06F 8/65* (2013.01); *H04L 63/0853* (2013.01); *H04L 63/20* (2013.01)

(58) Field of Classification Search
CPC ........ G06F 8/65; H04L 63/20; H04L 63/0853
See application file for complete search history.

(56) References Cited

U.S. PATENT DOCUMENTS

| | | | |
|---|---|---|---|
| 8,868,796 B1* | 10/2014 | Wojcik | G06F 8/71 710/8 |
| 9,451,035 B2* | 9/2016 | Williamson | H04W 4/02 |
| 9,513,893 B2* | 12/2016 | Rothrock | G06F 8/65 |
| 2012/0190354 A1* | 7/2012 | Merrien | H04W 8/22 455/422.1 |
| 2012/0226582 A1* | 9/2012 | Hammad | G06F 21/34 705/26.41 |
| 2012/0260118 A1* | 10/2012 | Jiang | G06F 9/4843 713/340 |
| 2015/0095460 A1* | 4/2015 | Berger | H04L 67/06 709/219 |
| 2016/0323742 A1* | 11/2016 | Huang | H04W 12/12 |

* cited by examiner

*Primary Examiner* — Khoi V Le
(74) *Attorney, Agent, or Firm* — Dickinson Wright RLLP

(57) ABSTRACT

Activities involving a secure element (SE) in a mobile device include a background operation. When the SE initiates the background operation, it informs the mobile device of an estimated duration. The mobile device thus recognizes that the SE is not in a stuck state, and maintains a clock signal and a power flow to the SE. Firmware updates to the SE include erasing a non-volatile (NV) memory in the SE in parallel with firmware or software updates to other processor systems in the mobile device. Needed data, for example calibration data or cryptographic key data, is preserved by storing data from some processor systems in one or more supplementary security domains (SSDs) in the SE. When a given processor system completes a firmware update, the needed data is restored to the processor system from the SSD.

20 Claims, 9 Drawing Sheets

US 10,664,257 B2

SECURE ELEMENT ACTIVITIES

This application claims benefit of U.S. Provisional Patent Application No. 62/157,920 filed on May 6, 2015 and entitled "Methods and Apparatuses to Support Secure Element Storage and Operations," the contents of which are incorporated by reference herein.

FIELD

The described embodiments set forth techniques for enabling a secure element included in a mobile device to i) provide an indication that a background operation is being performed, ii) erase non-volatile memory of the secure element in parallel with a firmware update of a component of the mobile device, and iii) provide secure storage of critical data for a component of the mobile device during a firmware update of the component.

BACKGROUND

Most mobile devices are configured to utilize secure elements known as Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card (commonly referred to as a SIM card) that is configured to be inserted into a UICC-receiving bay included in a mobile device. In more recent implementations, however, UICCs are being embedded directly into system boards of mobile devices. An embedded or electronic UICC (eUICC) manages a number of electronic Subscriber Identity Modules (eSIMs) stored therein, thereby enabling a mobile device to communicate with a number of respective MNOs.

Typically, the UICC/eUICC processes various commands provided by the mobile device (e.g., commands issued by a baseband component included in the mobile device). In other words, the mobile device communicates the commands to the UICC/eUICC, and, in turn, the UICC/eUICC promptly processes the command and performs the associated operations. In some cases, when the UICC/eUICC needs more time to perform a particular operation, the UICC/eUICC communicates a "MORE TIME" command (e.g., as defined in ETSI TS 102 223), which indicates that additional time is needed by the UICC/eUICC to fully process the particular operation. According to some configurations, when a threshold number of "MORE TIME" commands are received by the mobile device, the mobile device assumes that the UICC/eUICC is stuck in an error state (e.g., the UICC/eUICC has ceased performing an operation). In response, the mobile device initiates an error recovery process for the UICC/eUICC where UICC/eUICC is reset and powered-down.

SUMMARY

Representative embodiments set forth herein disclose various techniques for enabling a secure element (for example, a UICC or an eUICC) included in a mobile device to indicate that an operation requiring more than a threshold amount of time is being performed by the secure element. When the secure element initiates the operation, the secure element issues a command to the mobile device indicating an estimated duration for the operation. In other words, the secure element indicates to the mobile device an estimated amount of time that the secure element will take to complete the operation. The mobile device supplies power and maintains the clock for the estimated duration indicated in the command to ensure that the secure element has sufficient time to complete the operation. This prevents the mobile device from powering down the secure element prior to completion of the operation.

In some embodiments presented herein a component of a mobile device, determines first and second keys based on a hardware identifier, encrypts, using the first key, a first data portion to produce a second data portion, performs, using the second key, a first authentication handshake with a supplemental security domain (SSD) of a secure element (SE), stores the second data portion in the SSD, erases a non-volatile (NV) memory of the component, stores a firmware update data portion in the NV memory, regenerates a regenerated first key and a regenerated second key, performs, using the regenerated second key, a second authentication handshake with the SSD, retrieves the second data portion from the SSD, decrypts, using the regenerated first key, the second data portion to produce the first data portion, and stores the second data portion in the NV memory. NV memory is sometimes referred to as flash memory.

A mobile device, in some embodiments, receives a software update that includes a firmware update for the SE in the mobile device. The software update can take on the order of a few minutes to complete. Erasing an NV memory in the SE can take on the order of tens of seconds. By erasing the NV memory in the SE while the mobile device is updating another component, such as the application processor (AP), the overall time for the update can be reduced. The process can be authenticated by the SE verifying the command to erase the NV, thus thwarting any attempted denial of service (DOS) attacks by malicious third parties. The data is kept secret by the source (for example, a source acting under authority of a mobile network operator (MNO)) encrypting it and the SE having the proper key or keys for decrypting it. The keys for authentication and decryption are in some embodiments, stored in the SE. Disclosed embodiments provide a speedy, secure, and DOS-attack-resistant firmware update process. The mobile device, in some embodiments, receives a firmware update file, wherein the firmware update file comprises an encrypted portion and a message authentication code (MAC), a baseband component of the mobile device initiates an NV memory erasure, wherein the NV memory is in the SE. The SE, in some embodiments, erases the NV memory. In some embodiments, the erasure is instructed to the SE by a message over an IS 7816 interface. While the SE is busy erasing, the mobile device initiates a second firmware update process, for example of the AP. The mobile device sends the firmware update file to the SE. The SE validates the MAC. In some embodiments, an Issuer Security Domain (ISD) in the SE, provides a key for MAC validation and/or performs the MAC validation. If the MAC is faulty, the process stops and the firmware update file is discarded. When the MAC is successfully authenticated, the SE decrypts the encrypted portion to produce a first data portion. In some embodiments, the key for decryption is produced by the ISD. The SE then writes the first data portion to the NV memory. In some embodiments, the mobile device fragments the firmware update file before sending the fragments over the IS 7816 interface to the SE.

In some embodiments, a non-transitory computer readable medium stores instructions. When the instructions are executed by a component of a mobile device, the component carries out steps comprising: determining, based on a hardware identifier, a first key and a second key; encrypting, using the first key, a first data portion to produce a second data portion; performing, using the second key, a first authentication handshake with a supplemental security domain (SSD) of a secure element (SE); storing the second data portion in the SSD; erasing a non-volatile (NV) memory of the component; storing a firmware update data portion in the NV memory; regenerating a regenerated first key and a regenerated second key; performing, using the regenerated second key, a second authentication handshake with the SSD; retrieving the second data portion from the SSD; decrypting, using the regenerated first key, the second data portion to produce the first data portion; and storing the second data portion in the NV memory.

In some embodiments, a mobile device receives a firmware update file, wherein the firmware update file comprises an encrypted portion and a message authentication code (MAC). A baseband component of the mobile device, in some embodiments, initiates a non-volatile (NV) memory erasure, wherein the NV memory is in a secure element (SE), and wherein the baseband component and the SE are hardware components included in the mobile device. In some embodiments, the SE erases the NV memory. While the SE is erasing the NV memory, the mobile device, in some embodiments, initiates a second firmware update process of an application processor (AP), wherein the AP is a hardware component included in the mobile device. The mobile device then, in some embodiments, sends the firmware update file to the SE. The SE validates the MAC using a a first key from an Issuer Security Domain (ISD) in the SE. The SE then decrypts, using a second key from the ISD, the encrypted portion to produce a first data portion and writes the first data portion to the NV memory.

In some embodiments, the mobile device sends the firmware update by fragmenting the firmware update file into a first fragment and a second fragment, sending the first fragment over an IS 7816 interface to the SE, and sending the second fragment over the IS 7816 interface to the SE. In some embodiments, the SE verifies that an MNO has authorized the erasure before commencing to erase the NV memory . . . . In some embodiments, the baseband component initiates the NV memory erasure by sending a message over an IS 7816 interface to the SE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
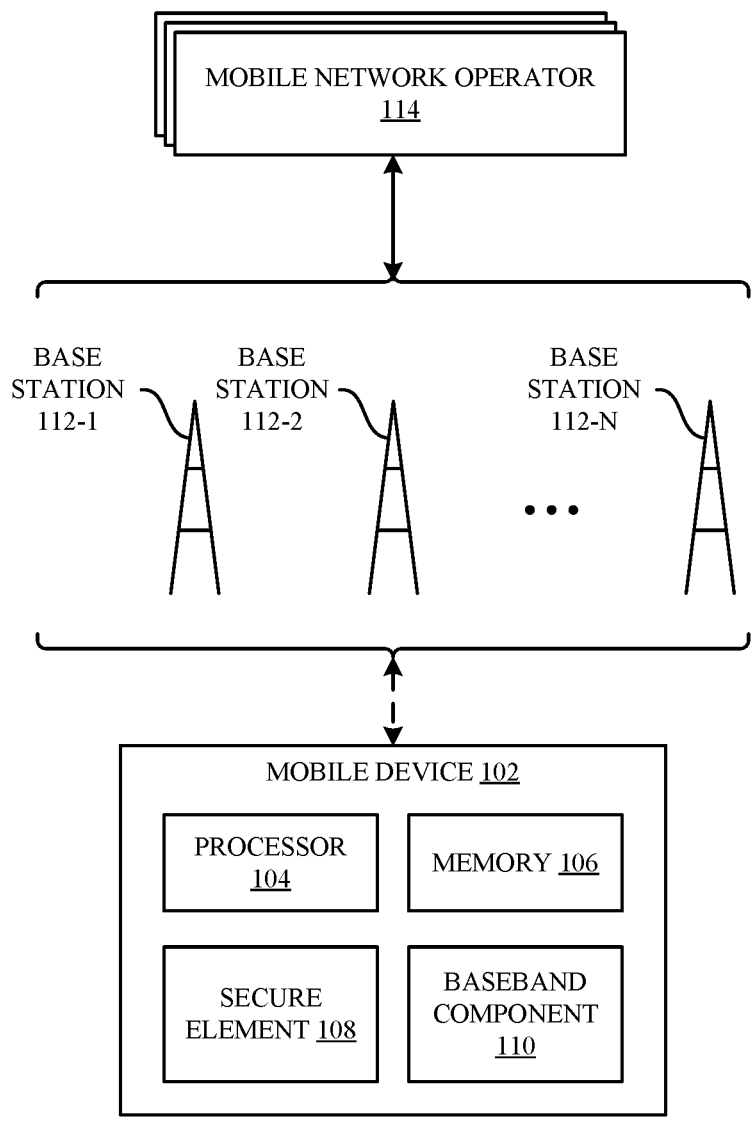
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

An UICC/eUICC can initiate a background operation that takes a considerable amount of time to carry out, even when the mobile device does not have outstanding commands for the UICC/eUICC. In some cases, when such a background operation is initiated, the mobile device can erroneously conclude that the UICC/eUICC is stuck in an error state after a threshold number of "MORE TIME" commands have been issued by the UICC/eUICC when carrying out the background operation. This results in the mobile device powering down the UICC/eUICC while the UICC/eUICC is performing the background operation, thereby causing the background operation to fail.

The embodiments described herein set forth techniques for enabling a secure element included in a mobile device to indicate when a background operation requiring a considerable amount of time is being performed by the secure element. According to one embodiment, the secure element communicates a proactive command to the mobile device indicating that it is performing the background operation. The proactive command includes an estimated duration for the background operation. In turn, the mobile device maintains the clock and power to the secure element to ensure that the secure element can complete the background operation without interruption.

Accordingly, the techniques described herein provide a mechanism for indicating when a background operation is being performed by a secure element to prevent a mobile device from powering down the secure element while performing the background operation. A more detailed discussion of these techniques is set forth below and described in conjunction with FIGS. 1-9, which illustrate detailed diagrams of systems and methods that can be used to implement these techniques.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102 and a group of base stations 112 that are managed by different MNOs 114. According to the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed.

As shown in FIG. 1, the mobile device 102 can include a processor 104, a memory 106, a secure element 108, and a baseband component 110. These components work in conjunction to enable the mobile device 102 to provide useful features to a user of the mobile device 102, such as localized computing, location based services, and Internet connectivity. The secure element can include a removable Universal Integrated Circuit Card (UICC) or an embedded UICC (eUICC). As described in greater detail below, the secure element 108 can be configured to store multiple Electronic Subscriber Identity Modules (eSIMs) for accessing the different MNOs 114 through the base stations 112. For example, the secure element 108 can be configured to store an eSIM for each MNO 114 to which mobile device 102 is subscribed. Although not illustrated in FIG. 1, the mobile device 102 can also be configured to include a receiving bay for the removable UICC that manages one or more SIMs.

Figure 2:
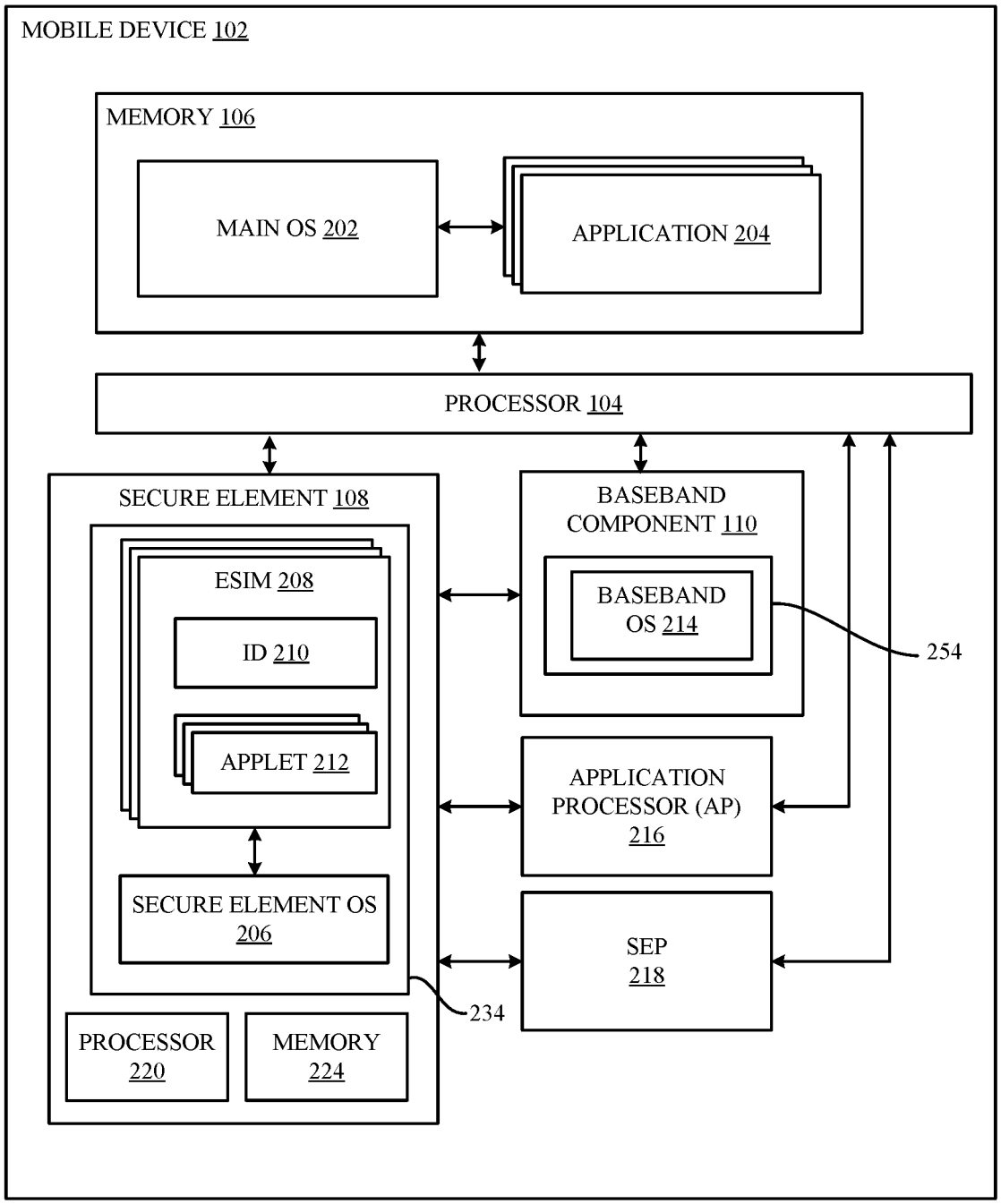
FIG. 2 illustrates a block diagram of a mobile device with a secure element (SE) included in it, according to some embodiments.

FIG. 2 illustrates a block diagram of a more detailed view 200 of particular components of the mobile device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the secure element 108 can be configured to implement a secure element OS 206. Hardware resources of the secure element 108 include a processor 220, a memory 224, and a non-volatile (NV) memory 234. When the secure element 108 performs a firmware update process, the processor 220 running a program (for example, a BIOS) from the memory 224 can perform an erasure of the NV memory 234 and a write operation to the NV memory 234 to put firmware update data in place. The secure element OS 206 can also be configured to manage eSIMs 208 that are stored by the secure element 108, e.g., by activating the eSIMs 208 within the secure element 108 and providing the baseband component 110 with access to the eSIMs 208. According to the illustration shown in FIG. 2, each eSIM 208 can be associated with a unique identifier (ID) 210 and can include multiple applets 212 that define the manner in which the eSIM 208 operates. For example, one or more of the applets 212, when implemented by the baseband component 110 and the secure element 108, can be configured to enable the mobile device 102 to communicate with an MNO 114 and provide useful features (e.g., phone calls and internet) to a user of the mobile device 102. When the baseband component 110 performs a firmware update process, a processor running a program (for example, a BIOS) from local memory (processor and memory not shown) can perform an erasure of NV memory 254 and a write operation to the NV memory 254 to put firmware update data in place in the baseband component 110.

As also shown in FIG. 2, the mobile device 102 includes an application processor 216 that is configured to execute the applications, and further includes a secure/trusted components processor (SEP) 218 that is configured to utilize credentials (e.g., security certificates) for authentication purposes. For example, various commands and communications can be authenticated by providing a fingerprint via a fingerprint scanner included in the mobile device 102. In addition, the baseband component 110 of the mobile device 102 can include a baseband OS 214 that is configured to manage the hardware resources of the baseband component 110 (e.g., a processor, a memory, different radio components, etc.). According to one embodiment, the baseband component 110 can implement a manager (not illustrated in FIG. 2) that is configured to interface with the secure element 108 to implement the various techniques described herein, which include receiving an indication that the secure element 108 is performing an operation requiring more than a threshold amount of time, storing critical data associated with the baseband component 110 at the secure element 108, supporting an interface for erasing a non-volatile (NV) memory associated with the secure element 108, and the like. The manager also can be configured to implement various services (not illustrated in FIG. 2), e.g., a collection of software modules that are instantiated by way of the various applets 212 of activated eSIMs 208 that are included in the secure element 108. For example, the services can be configured to manage the different connections that exist between the mobile device 102 and the MNOs 114 according to the different eSIMs 208 that are activated. The AP 216 and the SEP 218 also include NV memory (not shown) that can each host, or store, unique firmware data as for the secure element 108 and the baseband component 110.

Figure 3:
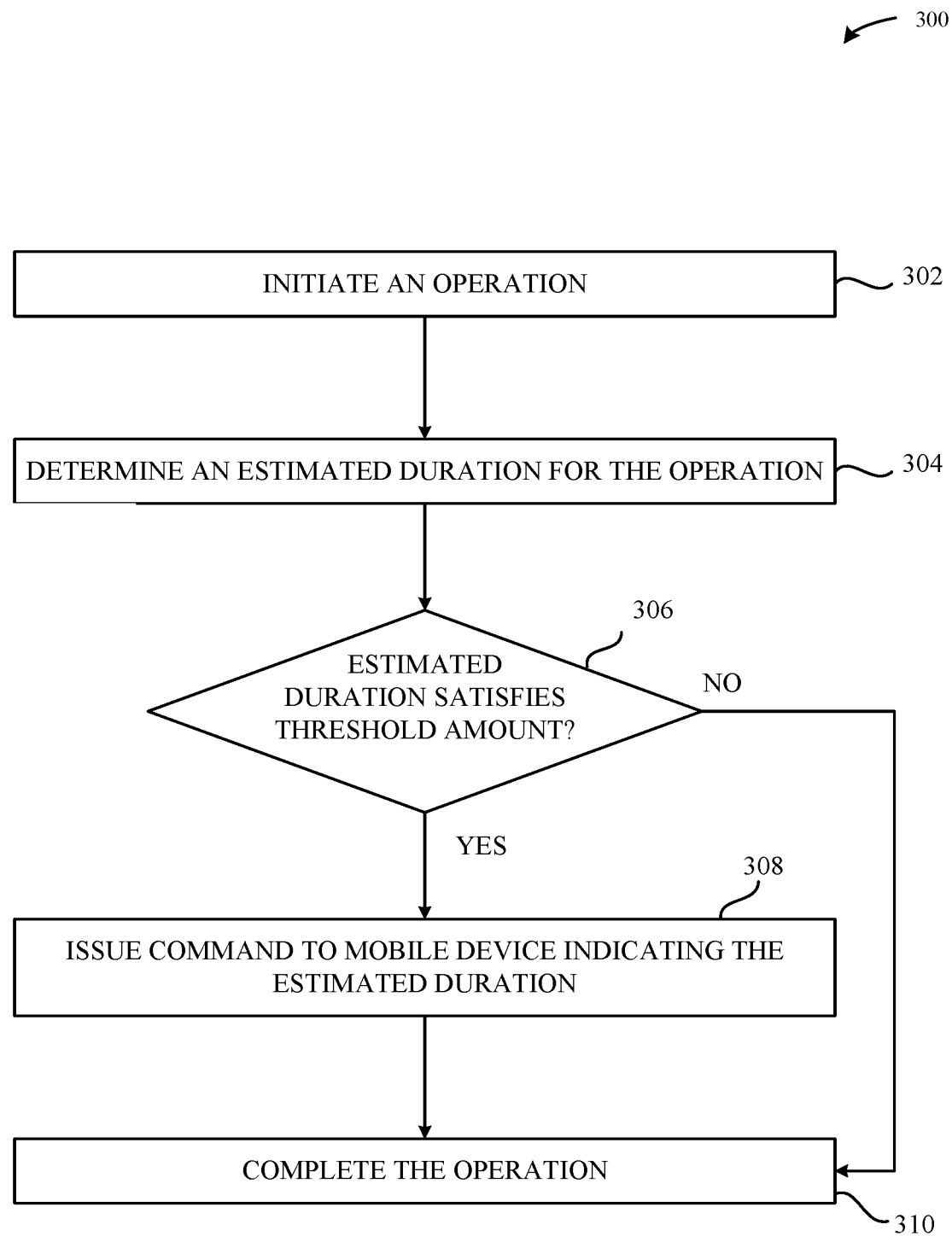
FIG. 3 illustrates a method of signaling an estimated duration that is carried out by the SE of FIG. 2, according to some embodiments.

FIG. 3 illustrates a method 300 that is carried out by the secure element 108 (e.g., the secure element OS 206) to perform various operations, according to some embodiments. As shown in FIG. 3, at a step 302, the secure element 108 initiates an operation. In some embodiments, the operation includes a background operation that is configured to take a considerable amount of processing time. In other words, the operation can represent a type of operation that consumes more time than a configurable threshold. Examples of such operations can include (but are not limited to) defragmentation and/or garbage collection process for an NV memory associated with the secure element 108, installation of eSIMs 208 in the secure element 108, erasing the NV memory for a firmware update associated with the secure element 108, and the like. In some implementations, the configurable threshold represents an amount of time that can be measured via a timer maintained by the mobile device 102. In other implementations, the configurable threshold represents a configurable number of "MORE TIME" commands that can be maintained by a counter included in the mobile device 102. Typically, when the configurable threshold amount is satisfied, the mobile device 102 assumes that the secure element 108 is stuck in an error state (e.g., the secure element 108 has ceased performing the operation) and initiates an error recovery process that involves resetting and powering down the secure element 108.

At a step 304, the secure element 108 determines an estimated duration for the operation. The estimated duration can represent an estimated amount of time that the secure element will take to complete the operation. At a step 306, the secure element 108 determines whether the estimated duration satisfies (e.g., is greater than) the threshold amount. When the secure element 108 determines that the estimated duration satisfies the threshold amount, the secure element 108 issues, at a step 308, a new proactive command to the mobile device 102 (e.g., the baseband component 110 of the mobile device 102) to avoid being powered down by the mobile device 102. According to some embodiments, the command indicates to the mobile device 102 that the secure element is performing the background operation, and the command includes the estimated duration for the operation. According to some embodiments, the command can be an extension of the "MORE TIME" command where the estimated duration is included in the "MORE TIME" command. The mobile device 102 receives the command and ensures that the power/clock remain active at least for the estimated duration so that the secure element 108 can complete the operation, at a step 310. In some embodiments, by including the estimated duration in the command, the mobile device 102 can intelligently poll the secure element 108 to avoid frequent polling that would increase overhead (e.g., due to context switches) and extend the amount of time it normally takes for the secure element 108 to complete the operation. In some embodiments, if the secure element 108 requires additional time to the complete the operation, the secure element 108 can issue additional commands to the mobile device 102. In addition, the error recovery process can be kept intact to ensure that the secure element 108 can be recovered when stuck in the error state.

Referring back to the step 306, when the secure element 108 determines that the estimated duration does not satisfy the threshold amount (e.g., is less than or equal to), the secure element 108 can continue with the operation and, when appropriate, indicate to the mobile device 102 that the operation has been completed, at the step 310.

In some implementations, the operation can be automatically initiated by the secure element 108 based on a number of factors (e.g., usage patterns). For instance, if the secure element 108 has been in use for a substantial amount of time, the secure element 108 can initiate a garbage collection/defragmentation process prior to performing any other operations. In other implementations, the defragmentation process can be manually triggered at the mobile device 102 at an appropriate time e.g., when the mobile device 102 is idle and is not performing any pending user-initiated operations). This can provide the benefit of increasing the speed and efficiency of operations performed after the defragmentation process.

In some embodiments, other mechanisms can be utilized for optimizing the manner in which the NV memory is erased when processing firmware updates for the secure element 108. Typically, the amount of time needed to erase the NV memory scales with the size of the NV memory and its performance. Notably, erasing the NV memory can consume a considerable amount of time, and can create an I/O bottleneck as NV memories typically do not support I/O operations while an erasure of the NV memory is being carried out. Moreover, firmware updates generally are encrypted and supported as part of a device software update where various components of the mobile device 102 are updated sequentially, which can further contribute to performance issues.

Figure 4:
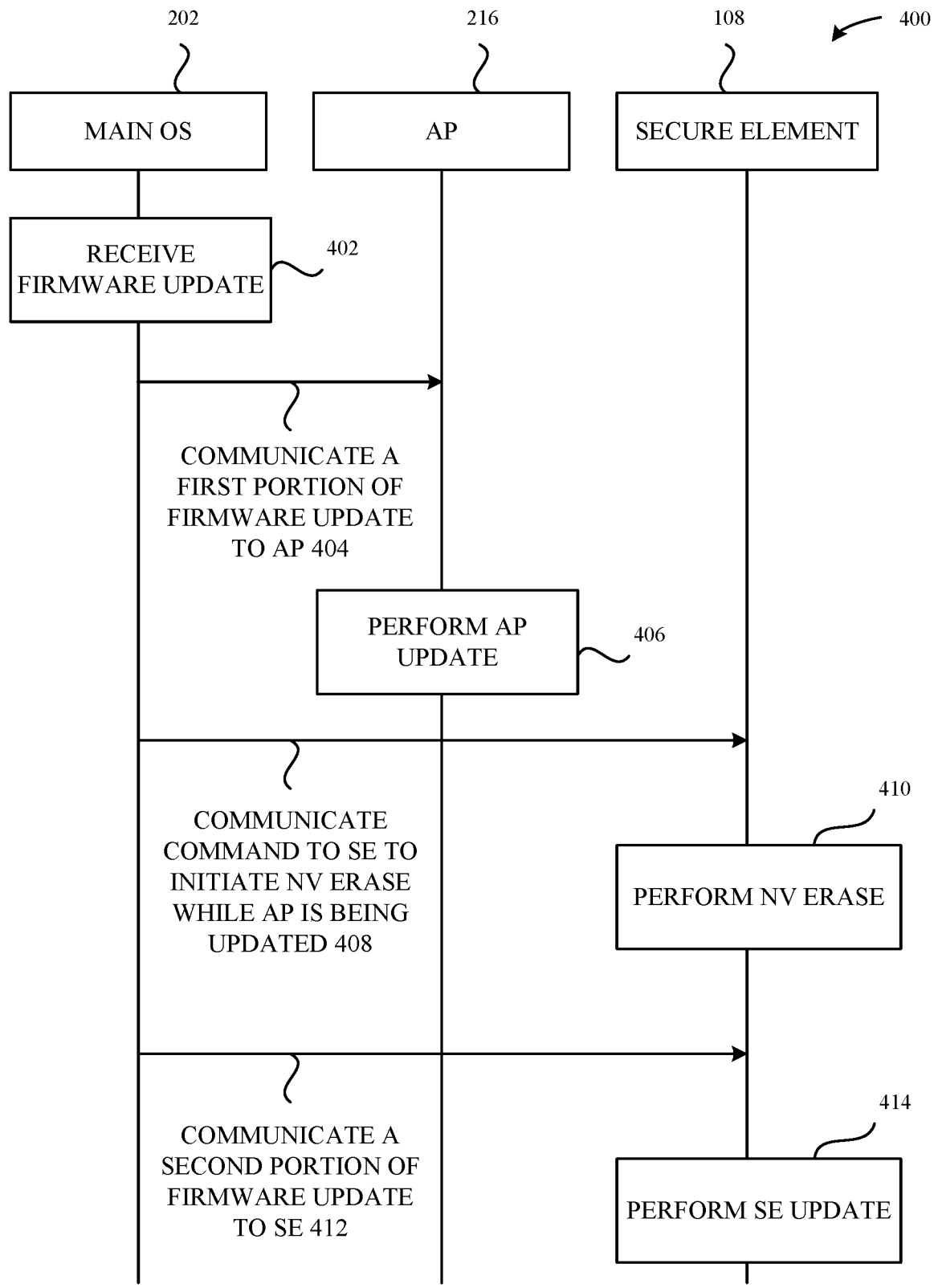
FIG. 4 illustrates a sequence diagram of performing a non-volatile (NV) memory erase in the SE of FIG. 2 while another component of the mobile device of FIG. 2 is receiving a firmware update, according to some embodiments.

FIG. 4 illustrates message and activities in a system 400 carried out when performing a firmware update, according to some embodiments. At 402, where the main OS 202 receives a firmware update for the mobile device 102. In some embodiments, the firmware update can be received or downloaded from a server, and can include updates for various components of the mobile device 102 (e.g., the application processor 216, the baseband component 110, the secure element 108, etc.).

At 404, the main OS communicates a first portion of the firmware update to the application processor 216. The first portion of the firmware update can include software updates for the application processor 216. At 406, the application processor 216 receives the first portion of the firmware update, decrypts the first portion of the firmware update, and performs the corresponding update. At 408, the main OS 202 communicates a command to the secure element 108 to initiate erasing the NV memory while the application processor 216 is being updated. In this manner, erasing the NV memory of the secure element 108 can be carried out in parallel with the updating of the application processor 216. At 410, the secure element 108 initiates erasing the NV memory in response to the command. Minimal software is required to support erasing the NV memory. For example, the baseband component 110 can run a secure element driver (UICC/eUICC driver) to support an interface (e.g., IS 7816 interface) for the purposes of communicating with the secure element (e.g., for erasing the NV memory). In some embodiments, the NV memory erasing operation is performed in a secure manner to protect against DoS attacks.

In some embodiments, at 410, when the secure element 108 initiates erasing the NV memory, the secure element 108 can also issue the proactive command to the mobile device 102 (as discussed in greater detail in FIG. 3), which indicates to the mobile device 102 that the secure element 108 is performing the NV memory erasing operation. According to some embodiments, the command can include an estimated duration for the NV memory erasing operation to complete.

In some embodiments, erasing the NV memory can be completed faster than the application processor 216 update. Referring back to FIG. 4, when erasing the NV memory is complete, the main OS 202 communicates a second portion of the firmware update to the secure element 108, at 412. The second portion of the firmware update includes updates for the secure element 108. The secure element 108 receives the second portion of the firmware update and performs the corresponding update, at 414. At 414, the secure element 108 can perform security operations that include decrypting the second portion of the firmware update, verifying that the firmware update has not been modified, and verifying that the firmware update is authorized. When the security operations are completed and the verification is successful, the second portion of the firmware update is written to the NV memory. In some cases, writing the firmware update to the NV memory can be faster than conventional approaches as the NV memory is already erased at 410.

In this manner, the firmware update for the secure element 108 can be performed in an efficient manner and enhance customer experience. More specifically, the firmware update can be faster because the NV memory erasing operation of the secure element 108 is performed in parallel to updating another component of the mobile device 102 (e.g., application processor 216). While FIG. 4 depicts that the NV memory erasing operation is performed in parallel to updating the application processor, it is noted that the NV memory erasing operation can be performed in parallel to updating any other component included in the mobile device 102 (e.g., the baseband component 110), without departing from the scope of this disclosure.

In some cases, when a firmware update is performed, critical data associated with certain components of the mobile device 102 can be lost. The critical data can include any data that is sensitive or specific to a particular component/chip of the mobile device 102 and needs to be preserved for proper and efficient functioning of the component/chip. For example, in order to perform a firmware update for the baseband component 110, the baseband component 110 might need to be erased prior to performing the firmware update. In these cases, critical data associated with the baseband component 110 is lost, unless backed up or stored in a temporary location during the erasure. A loss of the critical data can render the chip inoperative because the critical data is needed to connect to a network. For example, the critical data can include calibration data associated with the baseband component 110 that is critical for cellular functionality and performance.

Typically, during the firmware update process, the critical data is communicated from the mobile device 102 to a remote server. The remote server stores the critical data and communicates the critical data back to the mobile device 102 when the firmware update is complete. The critical data obtained from the remote server is then used to re-program the baseband component 110 or restore the baseband component 110 software. The remote server-based approach has a number of drawbacks. For instance, establishing and maintaining a connection with the remote server is very demanding on the resources available to the mobile device 102 because the mobile device 102 has to ensure that the remote server is available and that the mobile device 102 has connectivity to the remote server.

To overcome the drawbacks associated with the remote server-based approach, the secure element 108 can be used to store the critical data associated with certain components (e.g., the baseband component 110, the application processor 216, the SEP 218, etc.) of the mobile device 102. In particular, different security domains for each of the components of the mobile device 102 can be created within the secure element 108. This approach enables the critical data to be stored in a secure and efficient manner within the secure element 108 and reduces or eliminates the need and the time involved to communicate with the remote server.

Figure 5:
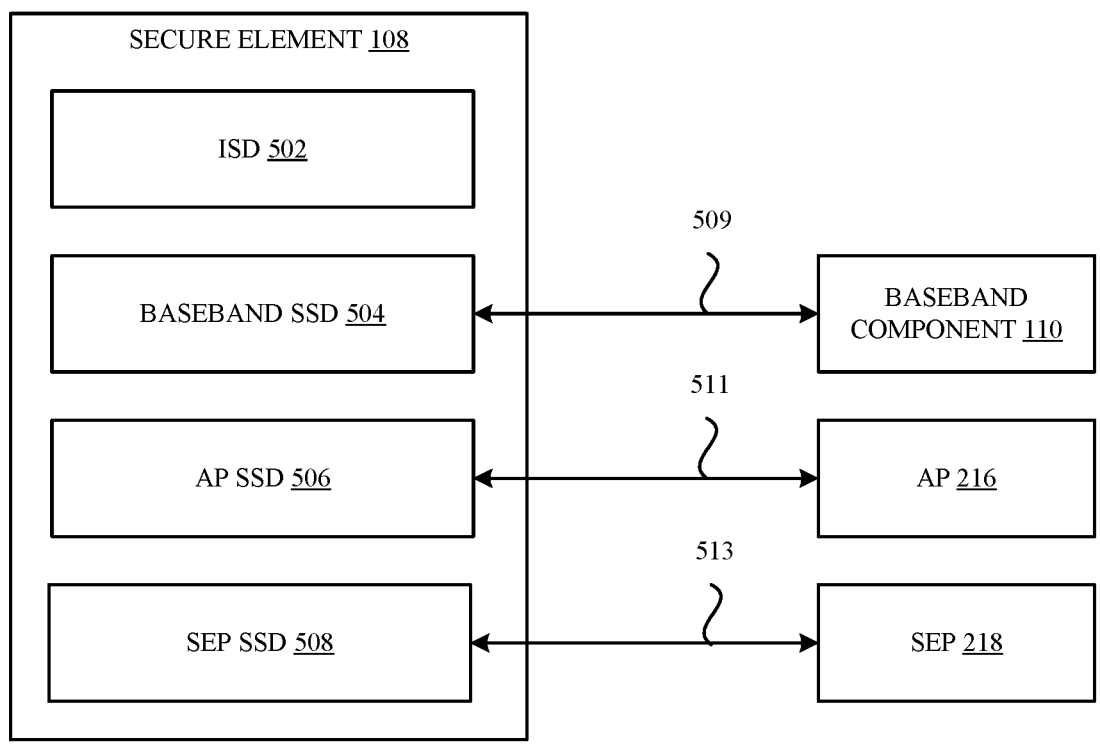
FIG. 5 illustrates a block diagram of various components of the SE of FIG. 2 storing data in supplementary security domains (SSDs) of the SE, according to some embodiments.

FIG. 5 illustrates a block diagram of a more detailed view 500 of particular components of the secure element 108 that can be configured to store critical data, according to some embodiments. According to some embodiments, the secure element 108 can be configured to implement sandboxed hardware/software environments that cannot be directly accessed by external entities, such as main OS 202 executing on the mobile device 102. For example, The GlobalPlatform™ Specification offers security services to various applications on the secure element 108 via standardized applications called security domains. Each security domain holds a set of cryptographic keys facilitating secure communication with an owner of the security domain. Access to a security domain is limited to processes with access to a cryptographic key for the respective security domain.

As shown in FIG. 5, the secure element 108 can be configured to store an Issuer Security Domain (ISD) that is owned and/or managed by an issuer (e.g., device manufacturer) and various security domains associated with eSIMs 208 (not illustrated in FIG. 5). The ISD holds a set of cryptographic keys (also referred to as "ISD keys") associated with the issuer that facilitates secure communication with the issuer. In addition, the secure element 108 can include a number of Supplemental Security Domains (SSDs) that are separate from the security domains associated with the eSIM 208 and are created to store critical data associated with various components of the mobile device 102. For example, baseband SSD 504 is configured to store critical data associated with the baseband component 110, the application processor (AP) SSD 506 is configured to store critical data associated with the AP 216, and the SEP SSD 508 is configured to store critical data associated with the SEP 218. In some embodiments, when the critical data is sensitive in nature, the component can encrypt the critical data and store the encrypted data at the respective SSD. In some embodiments, the critical data is stored as a data binary large object (BLOB).

In some embodiments, the SSDs can be created in the Original Equipment Manufacturer (OEM) factory or in the field. In one example, the OEM may be a mobile device OEM. In some implementations, the SSD can be created in the OEM factory and can be configured with ISD keys, where the OEM holds the ISD key set. In other implementations, the SSD can be created with an initial key set by a chip/secure element vendor. Then, in the OEM factory, a particular component (e.g., baseband component 110) for which the particular SSD (e.g., baseband SSD 504) is created uses the initial key set to authenticate to the SSD and generates a new key set that can be used to communicate with the SSD. For example, the baseband component 110 can generate the new key set based on a deterministic algorithm using chip-specific data (e.g., chip number/identifier). In this manner, each component (the baseband component 110, the AP 216, the SEP 218, and/or other components) of the mobile device 102 can generate a key set specific to the component that is used to communicate only with the respective security domain (the baseband SSD 504, the AP SSD 506, the SEP SSD 508, etc.) in order to store/retrieve the associated critical data in a secure manner. Furthermore, by utilizing hardware-based identifiers (e.g., chip-specific data) to generate the key set, the need to store the key set during firmware updates is eliminated because the hardware-based identifiers can be used by the components to re-generate the key sets as needed.

In some embodiments, existing GlobalPlatform™ protocols can be used for communication between the components of the mobile device 102 and the secure element 108. As shown in FIG. 5, various secure channel protocols, such as, SCP80, SCP02/03, and GlobalPlatform™ Amendment E, can be used for secure communication between the components and the secure element 108. Exemplary protocol communications are indicated by the double-headed arrows 509, 511, and 513. In one implementation, the SCP80 protocol is used for communication as indicated by 509 between the baseband component 110 and the secure element 108. In this case, the baseband component 110 holds the SCP80 key and uses an existing Remote File Management (RFM) protocol (defined in ETSI TS 102 225/102 226) to create files for storing the critical data associated with the baseband component 110 at the baseband SSD 504. The baseband component 110 can create files for different purposes and save the files with appropriate content at the baseband SSD 504.

Other existing protocols can be used by the components to store the critical data in a similar manner. SCP80, in some embodiments, is the protocol of protocol communications 509, 511 and/or 513. SCP02/03, in some embodiments, is the protocol of protocol communications 509, 511 and/or 513. In some embodiments, GlobalPlatform™ Amendment E is the protocol of protocol communications 509, 511 and/or 513.

Figure 6:
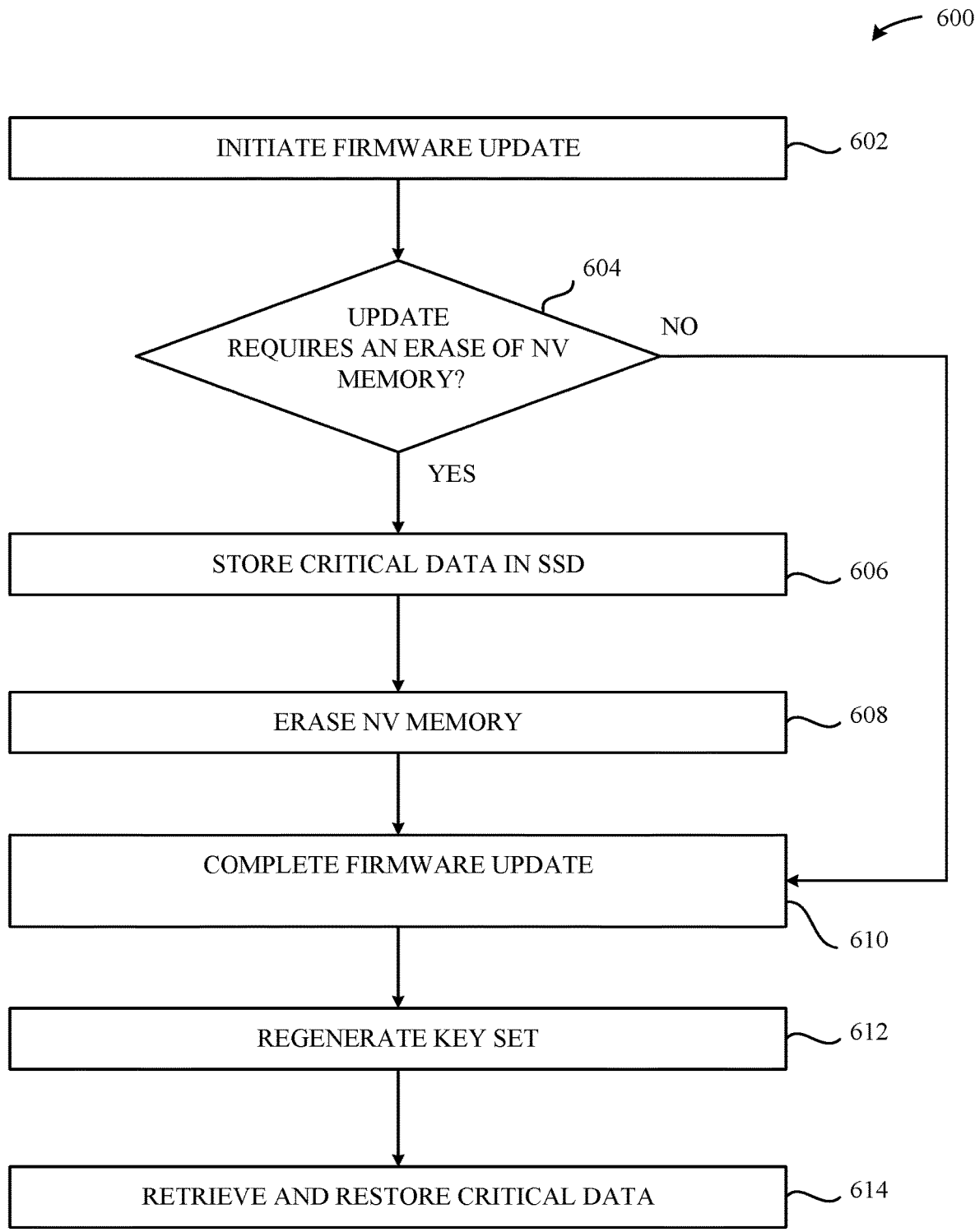
FIG. 6 illustrates a method that is carried out by a particular component of the mobile device for storing data in an SSD of FIG. 5, according to some embodiments.

FIG. 6 illustrates a sequence diagram of a method 600 that is carried out by a particular component (e.g., the baseband component 110) of the mobile device 102 to store the critical data, according to some embodiments. As shown, the method 600 begins at step 602, where the baseband component 110 of the mobile device 102 initiates a firmware update. At step 604, during the update, a determination is made as to whether the firmware update requires the NV memory associated with the baseband component 110 to be erased. When a determination is made that the firmware update does not require the NV memory to be erased, the baseband component 110 can continue with completing the firmware update, at step 610. However, when a determination is made that the firmware update requires the NV memory to be erased, the baseband component 110 uses a key set (associated with the baseband component 110) to authenticate to the secure element 108 and store critical data associated with the baseband component 110 in the baseband SSD 504, at step 606. In this manner, the critical data can be stored in the baseband SSD 504 prior to erasing the NV memory. It will be appreciated that the critical data can be stored in the SSD periodically or on an as-needed basis to ensure that the critical data is up-to-date.

At step 608, the NV memory associated with the baseband component 110 is erased. The firmware update is completed after erasing the NV memory, at step 610. Once the firmware update is complete, the baseband component 110 re-generates the key set (e.g., based on the hardware-based identifiers), at step 612. At step 614, the baseband component 110 uses the regenerated key set to authenticate to the secure element 108, retrieve the critical data stored in the baseband SSD 504, and restore the critical data at the baseband component 110.

Figure 7:
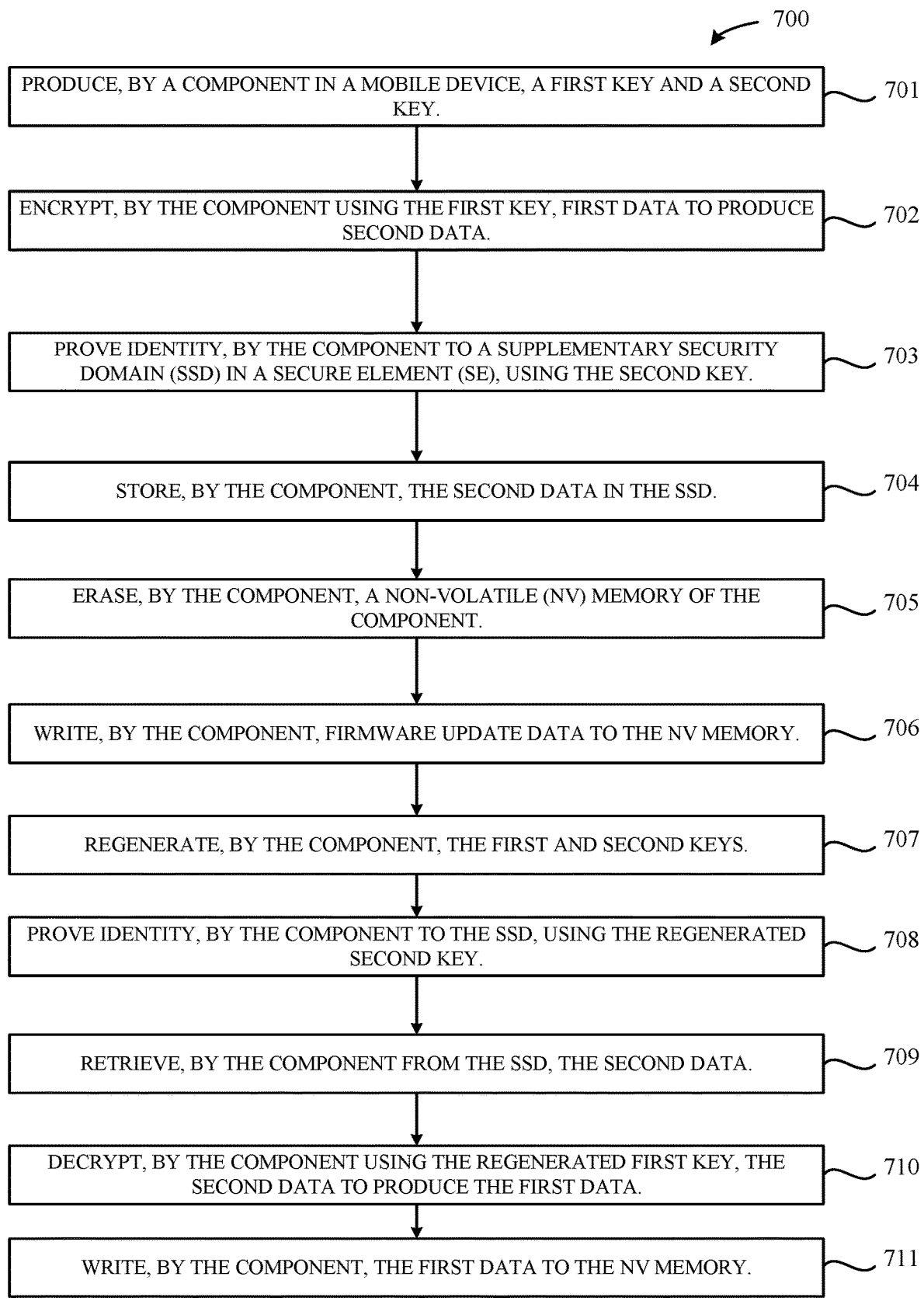
FIG. 7 illustrates a data storage method that is carried out by a particular component of the mobile device of FIG. 1, using first and second keys, according to some embodiments.

Logic for storing first data of a mobile device component is provided in FIG. 7. At 701, a component in the mobile device produces a first key and a second key. The keys are produced based on an identifier of the component. At 702, the component encrypts the first data using the first key to produce second data. The first data, in some embodiments, is calibration data needed for operation of a baseband component. The component will now store the second data in a secure element (SE). In some embodiments, the component proves identity (performs authentication), as shown at 703 to a supplementary security domain (SSD) in the SE using the second key. After successful authentication, at 704 the component stores the second data in the SSD. The first data has been backed-up to the SSD. The component, at 705, erases an NV memory of the component. At 706, the component writes firmware update data to the NV memory. At 707, the component regenerates the first and second keys. At 708, the component, in some embodiments, again proves its identity to the SSD, this time using the regenerated second key. At 709, the component retrieves from the SSD the second data. At 710, the component decrypts the second data using the regenerated first key to produce the first data. At 711, the component writes the first data to the NV memory. In some embodiments, the first data is calibration data necessary for operation of a baseband component.

Figure 8:
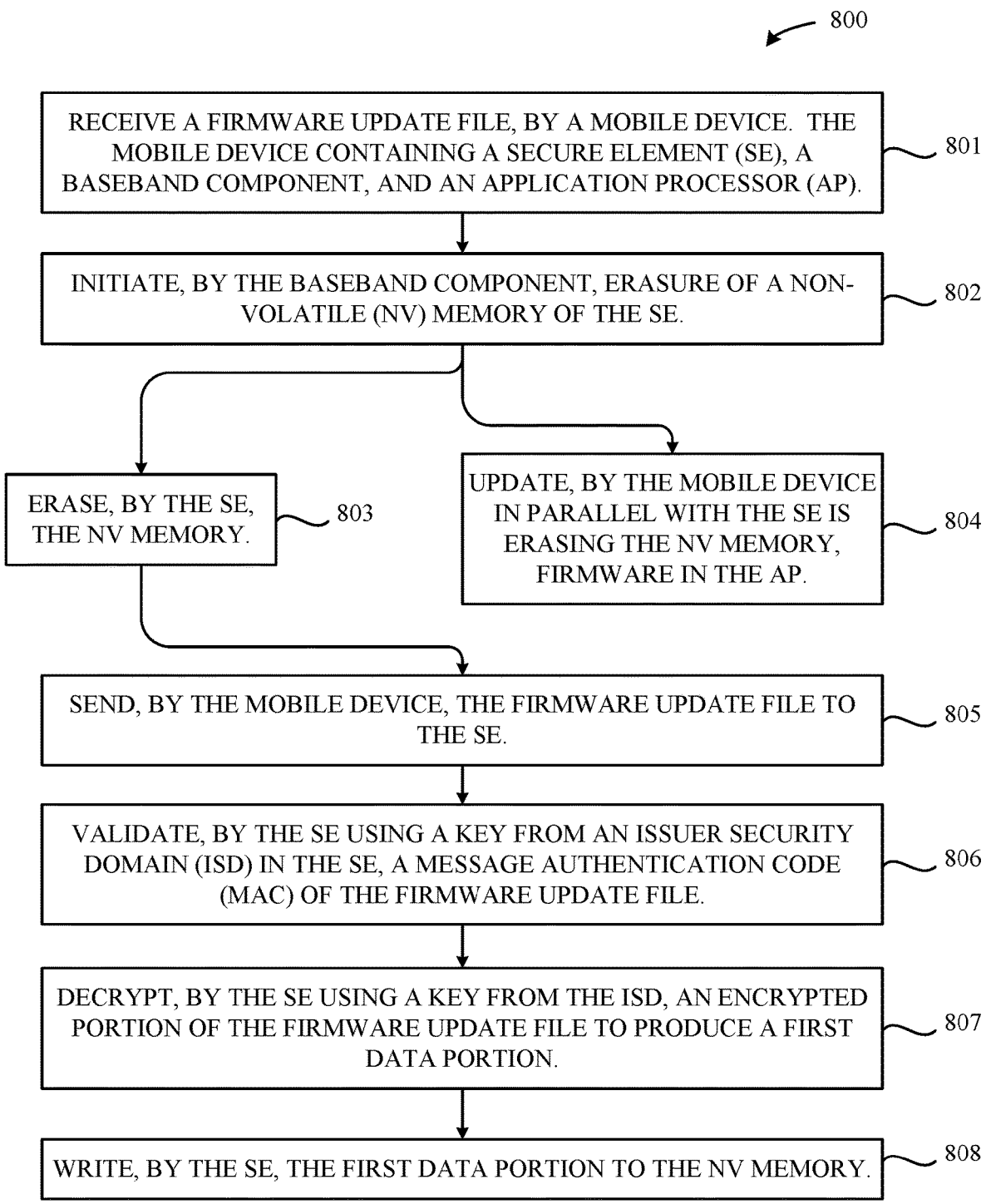
FIG. 8 illustrates an example method in which an NV memory in the SE of FIG. 2 is erased in parallel with a firmware update to an application processor (AP) of FIG. 2, according to some embodiments.

Logic for saving time when performing a software update in a mobile device is provided in FIG. 8. The mobile device includes an SE, a baseband component, and an AP. At 801, the mobile device receives a firmware update file. At 802 the baseband component initiates erasure of an NV memory of the SE. Next, two activities overlap in time, thus saving time. At 803, the SE erases the NV memory in the SE. At 804, the mobile device updates firmware, in some embodiments, firmware in the AP. At 805, the mobile device sends the firmware update file to the SE. In some embodiments, at 806, the SE validates a message authentication code (MAC) of the firmware update file using a key from an issuer security domain (ISD) in the SE. If the MAC validation fails, the logic terminates (not shown). At 807, the SE decrypts an encrypted portion of the firmware update file using a key from the ISD. This produces a first data portion. At 808, the SE writes the first data portion to the NV memory.

Figure 9:
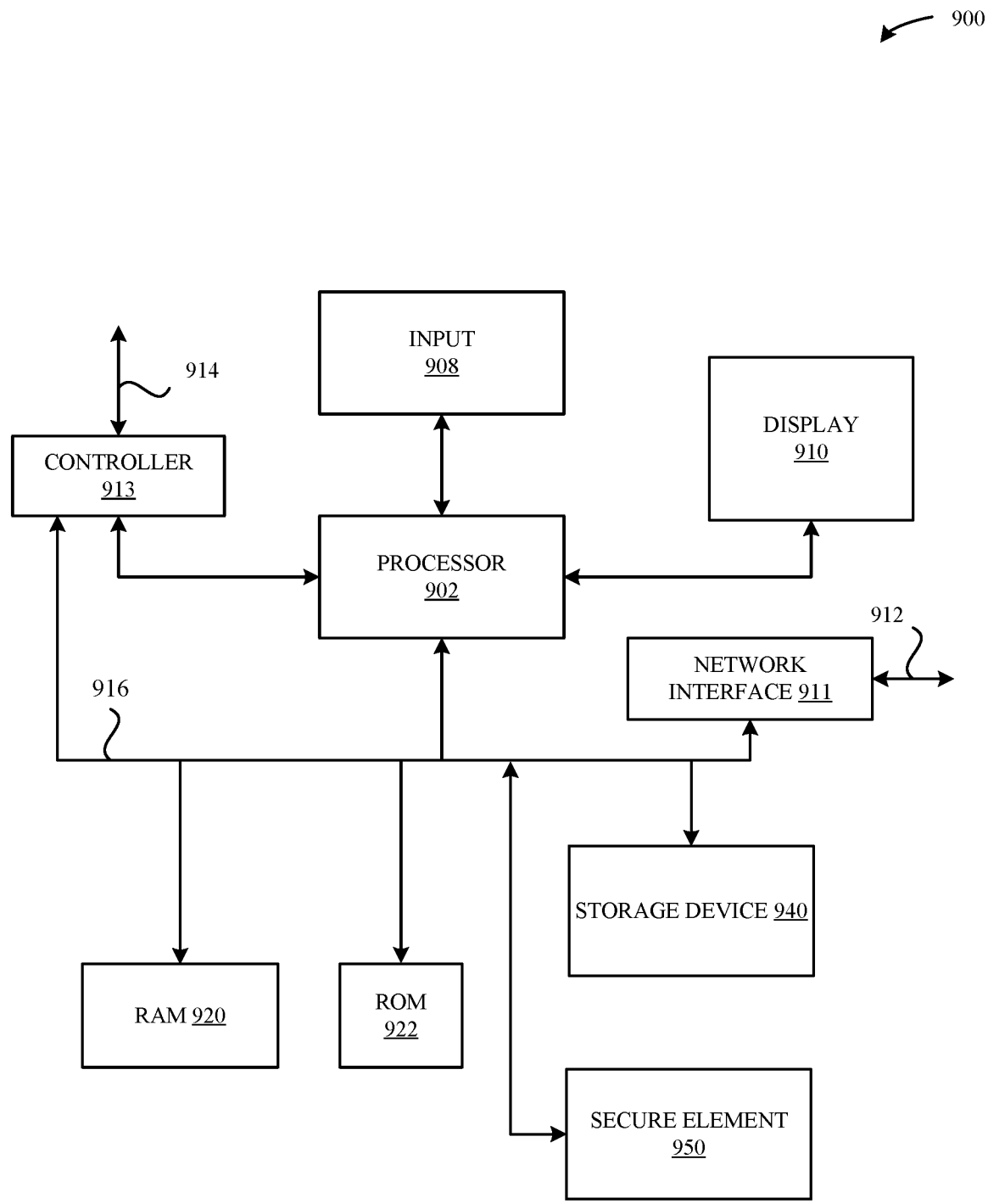
FIG. 9 illustrates a detailed view of a computing device that can be used to implement the various components described herein, according to some embodiments.

FIG. 9 illustrates a detailed view of a computing device 900 that can be used to implement the various components described herein, according to some embodiments. In particular, the detailed view illustrates various components that can be included in the mobile device 102 illustrated in FIG. 1. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user. A data bus 916 can facilitate data transfer between at least a storage device 940, the processor 902, and a controller 913. The controller 913 can be used to interface with and control different equipment through and equipment control bus 914. The computing device 900 can also include a network/bus interface 911 that couples to a data link 912. In the case of a wireless connection, the network/bus interface 911 can include a wireless transceiver.

The computing device 900 also include a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 can further include a secure element 950, which can represent the secure element 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for maintaining clock and power signals at a secure element included in a mobile device, the method comprising:
at the secure element:
performing a background operation;
determining an estimated duration for the background operation;
determining whether the estimated duration satisfies a threshold amount of time after which a hardware component of the mobile device external to the secure element is configured to initiate an error recovery process that includes resetting and powering down the secure element; and
when the estimated duration satisfies the threshold amount of time:
communicating, to the hardware component, a message indicating that the secure element is performing the background operation, wherein the message includes the estimated duration for the background operation to cause the hardware component to refrain from initiating the error recovery process for the secure element until after the estimated duration for the background operation, and
receiving the clock and power signals from the mobile device for at least the estimated duration,
wherein the secure element is configured to store one or more profiles for access by the mobile device to cellular services of a mobile network operator.

2. The method of claim 1, wherein the background operation comprises a non-volatile (NV) memory defragmentation process.

3. The method of claim 2, wherein the NV memory defragmentation process is triggered by a request from the mobile device.

4. The method of claim 1, further comprising:
at the secure element:
receiving no poll from the mobile device during an interval extending from communicating the message to expiration of the estimated duration; and
receiving a poll from the mobile device after the estimated duration expires.

5. The method of claim 1, wherein the background operation comprises an installation of an electronic Subscriber Identity Module (eSIM) on the secure element.

6. The method of claim 1, wherein the background operation comprises erasing a non-volatile (NV) memory.

7. The method of claim 6, wherein the NV memory is erased during a firmware update process performed by the secure element.

8. The method of claim 7, wherein the firmware update process performed by the secure element at least partially overlaps in time an installation of a firmware update data into the hardware component of the mobile device external to the secure element.

9. The method of claim 8, wherein the hardware component of the mobile device external to the secure element comprises an application processor (AP).

10. The method of claim 8, wherein the hardware component of the mobile device external to the secure element comprises a baseband component.

11. A mobile device comprising:
a hardware component; and
a secure element (SE) communicatively coupled to the hardware component, wherein the SE is configured to:
store one or more profiles for access by the mobile device to cellular services of a mobile network operator;
perform a background operation;
determine an estimated duration for the background operation;
determine whether the estimated duration satisfies a threshold amount of time after which the hardware component is configured to initiate an error recovery process that includes resetting and powering down the secure element; and
when the estimated duration satisfies the threshold amount of time:
communicate, to the hardware component, a message indicating that the SE is performing the background operation, wherein the message includes the estimated duration for the background operation to cause the hardware component to refrain from initiating the error recovery process for the secure element until after the estimated duration for the background operation, and
receive clock and power signals at the secure element from the mobile device for at least the estimated duration.

12. The mobile device of claim 11, wherein the background operation comprises a non-volatile (NV) memory defragmentation process.

13. The mobile device of claim 12, wherein the NV memory defragmentation process is triggered by a request from the hardware component of the mobile device.

14. The mobile device of claim 11, wherein the background operation comprises an installation of an electronic Subscriber Identity Module (eSIM) on the SE.

15. The mobile device of claim 11, wherein the background operation comprises erasing a non-volatile (NV) memory of the SE.

16. The mobile device of claim 15, wherein the NV memory is erased during a firmware update process performed by the SE.

17. The mobile device of claim 16, wherein the firmware update process performed by the SE at least partially overlaps in time installation of firmware update data into the hardware component of the mobile device.

18. The mobile device of claim 17, wherein the hardware component of the mobile device comprises an application processor (AP).

19. The mobile device of claim 17, wherein the hardware component of the mobile device comprises a baseband component.

20. A secure element of a mobile device comprising:
a processor communicatively coupled to a hardware component of the mobile device external to the secure element and to a memory storing instructions that, when executed by the processor, cause the secure element to:
perform a background operation;
determine an estimated duration for the background operation;
determine whether the estimated duration satisfies a threshold amount of time after which the hardware component of the mobile device is configured to initiate an error recovery process that includes resetting and powering down the secure element; and
when the estimated duration satisfies the threshold amount of time:
communicate, to the hardware component, a message indicating that the secure element is performing the background operation, wherein the message includes the estimated duration for the background operation to cause the hardware component to refrain from initiating the error recovery process for the secure element until after the estimated duration for the background operation, and
receive clock and power signals from the mobile device for at least the estimated duration,
wherein the secure element is configured to store one or more profiles for access by the mobile device to cellular services of a mobile network operator.

* * * * *